United States Patent Office 3,131,159
Patented Apr. 28, 1964

3,131,159
MIXTURE OF A SULFOCHLORINATED ALPHA-OLEFIN POLYMER AND A SULFOCHLORINATED HYDROCARBON
Ludwig Orthner, Frankfurt am Main, Martin Reuter, Kronberg, Taunus, Franz Landauer and Ernst Junghanns, Frankfurt am Main, and Erich Schmidt, Schonberg, Taunus, Germany, assignors to Farbwerke Hoechst Aktiengesellschaft vormals Meister Lucius & Brüning, Frankfurt am Main, Germany, a corporation of Germany
No Drawing. Filed May 24, 1960, Ser. No. 31,258
Claims priority, application Germany May 29, 1959
10 Claims. (Cl. 260—30.8)

The present invention relates to sulfochlorinated polyolefins having a good tackiness and to a process for their manufacture.

It is known to prepare sulfochlorination products of high pressure polyethylene or of polymerization products of lower olefins produced by a low pressure process, for example the Ziegler process. Said sulfochlorinated polyethylenes or polyolefins or copolymers of lower olefins, which have in most cases rubber-like properties, possess, however too small a tackiness on being processed in comparison with rubber. A good tackiness is very important in the processing of said polymers, for example for a rapid sheet formation on the roll, a good absorbing capacity for fillers, such as litharge or pigments or similar substances, and for the conditioning.

It has now been found that sulfochlorinated polyolefins which develop an excellent tackiness on being processed, for example when rolled, can be obtained by admixing the sulfochlorinated polyolefins with sulfochlorination products of higher aliphatic and/or araliphatic and/or cycloaliphatic hydrocarbons that may be halogenated.

Sulfochlorinated polyolefins, the tackiness of which can be improved according to the invention are, for example, the sulfochlorination products of high pressure polyethylene and preferably the sulfochlorination products of polyolefins produced by a low pressure process, especially the Ziegler process, from alpha-olefins containing about 2–6 carbon atoms in the chain. Especially favorable results are obtained with sulfochlorination products of low pressure polyethylene, low pressure, polypropylene, copolymers and polymer mixtures of the aforesaid compounds and particularly with an ethylene-propylene low pressure copolymer.

As compounds which are added to the aforesaid sulfochlorinated polyolefins, especially suitable are: (1) aliphatic saturated or unsaturated hydrocarbons having straight or branched chains of about 10–30 carbon atoms, for example diesel oil fractions of petroleum or Fischer-Tropsch hydrocarbons, preferably those having a boiling point in the range from about 200 to 400° C., and solid or semi-solid hydrocarbons which may contain unsaturated constituents such as mineral waxes, paraffins and paraffin slack waxes; (2) aromatic hydrocarbons such as alkyl benzenes containing altogether 10–35 carbon atoms in which the aliphatic side chains can be unsaturated or saturated, and either branched or straight, for example dodecyl benzene obtained for example by condensing tetrameric propylene with benzene, nonyl benzene, or diisobutyl benzene, especially good results being obtained for example with alkylated toluenes such as cymenes, diisopropyl toluenes or butyl toluenes; (3) cycloaliphatic hydrocarbons with longer aliphatic side chains of about 3–10 carbon atoms, for example isopropyl cyclohexane, pentyl cyclohexane, isoheptyl cyclopentane or diisopropyl cyclopentane.

The hydrocarbons mentioned sub (1)–(3) may be halogenated and preferably chlorinated. In the case of araliphatic hydrocarbons good results can be obtained with compounds that have been chlorinated in the nucleus or in the side chain. In general the chlorine content varies between 10–50%, compounds having higher or lower chlorine contents being likewise suitable.

The amount of the aforesaid hydrocarbon that is added to the sulfochlorinated polyolefins ranges in general from 1 to 20% by weight, but amounts which are outside said range are also suitable. Preferably 5–15% by weight of the hydrocarbons are added and especially good results are obtained with an addition of 8–12% by weight. All percent figures are calculated on the amount of polyolefin used.

The process of the invention can be carried out in simple manner by admixing the sulfochlorinated polyolefins with one or several of the aforesaid hydrocarbons which have been sulfochlorinated in a separate reaction. The compounds are preferably mixed and then rolled.

A further variant of the process of the invention consists in that the sulfochlorination of the polyolefins according to known processes is carried out in the presence of higher aliphatic and/or araliphatic and/or cycloaliphatic hydrocarbons as described above, which may be halogenated and preferably chlorinated.

For the manufacture of sulfochlorniated polyolefins which develop a good tackiness on being processed it is especially advantageous to use polyolefins which already contain the aforesaid hydrocarbons from the process used for making them and then to sulfochlorinate the compounds together. This applies, above all, to the alkyl benzenes, particularly alkyl toluenes and diesel oil fractions.

The improvement of the tackiness of the sulfochlorination products of polyolefins by the process of the invention offers considerable advantages. When the sulfochlorinated polyolefin is rolled once with the aforesaid components a sheet is rapidly formed on the roll in unobjectionable manner. In contradistinction thereto it was hitherto necessary to pass the material 3 to 5 times through the roll. Furthermore, the absorbing power of the sulfochlorinated polyolefins for fillers, such as litharge, pigments or the like is considerably improved. A further important economical advantage of the process of the invention resides in the fact that on dividing the continuous sheet and compressing it, which operation may become necessary prior to the final treatment, time and labor can largely be saved.

The sulfochlorination products of polyolefins obtained by the process of the invention possess, in addition to a good workability, the advantage that after having been vulcanized, they yield products having better mechanical properties than vulcanizates of sulfochlorination products of polyolefins obtained by known processes. As shown in the comparative examples below the resilience is increased with the decrease of the Shore hardness.

The following examples serve to illustrate the invention but they are not intended to limit it thereto.

*Example 1*

200 grams of a chlorinated amorphous ethylene-propylene copolymer (proportion ethylene:propylene 71:29 mol percent, $\eta_{red}$ value of the starting polymer produced by the Ziegler process=3.2, determined in a 0.5% solution in tetrahydro-naphthalene at 130° C.) having a chlorine content of 4.5% were dissolved at 60° C. together with 40 grams of dodecyl benzene in 2.5 liters of carbon tetrachloride. $\eta_{red}$ (eta$_{red}$) refers to the molecular weight of macromolecular products, and denotes the value $$\frac{\eta_{spec} \text{ (eta}_{spec})}{c}$$

Into said solution were then introduced at 60° C. and with irradiation by ultra-violet light 50 grams of sulfur dioxide and 75 grams of chlorine over a period of 3 hours. Subsequently the batch was freed from unreacted sulfur dioxide and chlorine, as well as hydrogen chloride formed in the reaction as by-product, by passing nitrogen through the batch. The carbon tetrachloride was removed by distillation, for example as described in Belgian Patent 578,595 and the remaining sulfochlorinated ethylene copolymer was dried at 50–60° C. in a vacuum drier. The sulfochlorination product contained 0.88% of sulfur and 12.4% of chlorine.

On being rolled once, the sulfochlorinated copolymer yielded a sheet having a good tackiness. Also a vulcanization mixture prepared of 100 parts by weight of the sulfochlorinated copolymer, 40 parts by weight of litharge, 2 parts by weight of mercapto-benzthiazole and 3 parts by weight of stearic acid formed a good sheet. When the aforesaid vulcanizable mixture was vulcanized for 40 minutes at 153° C. a rubber-elastic vulcanizate was obtained which was no longer tacky and possessed the following mechanical values. (For the sake of comparison we give the values of an analogous vulcanizate which had been prepared from a sulfochlorination product of the same ethylene-propylene copolymer having the same sulfur and chlorine content with the exception that the sulfochlorination was carried out without the addition of dodecyl benzene.)

|  | Vulcanizate of a sulfochlorination product prepared according to Example 1 | Comparative product |
|---|---|---|
| Resilience, percent | 47 | 43 |
| Shore hardness | 52 | 55 |

For obtaining a homogeneous sheet by rolling from the comparative product, it was necessary to roll it three times longer.

Instead of the amorphous ethylene-propylene copolymer a crystalline copolymer (proportion ethylene:propylene 90:10% by weight) produced by the process of French Patent 1,134,094 can be used. In this case, too, the sulfochlorination product yields a tacky sheet on rolling. Good effects can also be obtained with a partially crystalline ethylene-butene-(1) copolymer (ethylene-butene 83:17 mol percent, $\eta_{spec}/c=1.4$) or a terpolymer of ethylene-propylene-pentene-(1) ($C_2:C_3:C_5=$ 78:17:5 mol percent, $\eta_{spec}/c=2.2$.

*Example 2*

150 grams of amorphous ethylene-propylene copolymer (propylene content 32 mol percent, $\eta_{red}=2.2$, determined in a 0.5% solution of the copolymer in tetrahydronaphthalene at 130° C.) containing 6% by weight of diisopropyl toluene, which had been prepared in the manufacturing process of the copolymer in toluene, were dissolved at 60° C. in 2.5 l. of carbon tetrachloride. Under irradiation by ultraviolet light and at 60° C. 70 grams of chlorine were introduced within 2.5 hours and subsequently 38 grams of $SO_2$ and 65 grams of $Cl_2$ were introduced within 2¼ hours. After purging with nitrogen, the carbon tetrachloride was removed by distillation, for example as described in Belgian Patent 578,595. The product obtained which was dried in a vacuum drier at 60° C. contained 1.48% of sulfur and 29.9% of chlorine. The sheet obtained on a roll had good properties of tackiness (as described in Example 1).

*Example 3*

400 grams of high pressure polyethylene ($\eta_{red}=1$, determined in a 0.5% solution in tetrahydronaphthalene at 130° C.) were dissolved at 60° C. in 2.2 l. of carbon tetrachloride together with 60 grams of dodecyl benzene and the solution was chlorinated at said temperature under the irradiation by ultra-violet light for 4.5 hours. 28 grams of chlorine were introduced per hour. Subsequently 42 grams of sulfur dioxide and 65 grams of chlorine were introduced within 2.5 hours. The sulfochlorinated polyethylene was isolated as described in Example 2. The isolated product had a sulfur content of 1.97% and a chlorine content of 25.9%. It was considerably softer and more tacky than a product prepared in the same manner but without the addition of dodecyl benzene, and possessed an improved resilience.

A still better result can be obtained when, instead of the high pressure polyethylene, a low pressure polyethylene is used which has been prepared by polymerizing ethylene in the presence of a catalyst composed of chromium oxide, aluminum oxide and silica ($\eta_{spec}/c=$ 2.2, determined in a 0.5% solution in tetrahydronaphthalene at 130° C.). Good effects can likewise be obtained with a polypentene-(1) prepared in the presence of a Ziegler catalyst system ($\eta_{spec}/c=3.4$, determined as defined above).

*Example 4*

200 grams of a chlorinated crystalline ethylene-propylene copolymer (83 mol percent of ethylene and 17 mole percent of propylene, $\eta_{red}=1.24$, determined in a 0.5% solution in tetrahydronaphthalene at 130° C.) containing 21% of chlorine were dissolved at 60° C. in 2.2 l. of carbon tetrachloride together with 20 grams of a largely straight chain hydrocarbon mixture having a boiling range of about 250–320° C. With the irradiation by ultra-violet light 50 grams of sulfur dioxide and 30 grams of chlorine were introduced at 60° C. within 2 hours. After having distilled off the solvent as described in Belgian Patent 578,595 a sulfochlorinated copolymer was obtained containing 0.98% of sulfur and 24.8% of chlorine. Said product yielded a sheet on the roll having an excellent tackiness, and the following composition 100 parts by weight of sulfochlorinated polyolefin
40 parts by weight of litharge
6 parts by weight of abietic acid
2 parts by weight of dipentamethylene-thioran-tetrasulfide This sheet was vulcanized for 20 minutes at 155° C.

A copolymer as described above which was sulfochlorinated to the same sulfur and chlorine content, but without the addition of hydrocarbon, yielded, after a 400% longer rolling period, a sheet which was considerably harder. This sheet was vulcanized as described above. The absorption of the vulcanization additives took a 300% longer period that that required by the product of Example 4. The following values were found:

|  | Vulcanizate of the copolymer of Example 4 | Comparative vulcanizate |
|---|---|---|
| Resilience, percent | 34 | 29 |
| Shore hardness | 54 | 66 |

When, however, the comparative product was admixed, prior to rolling, with 12% of a sulfochlorinated hydrocarbon prepared by sulfochlorinating a diesel oil fraction having a boiling range of 180–230° C. and containing 8.4% of sulfur and 20.7% of chlorine, a product having a good tackiness was obtained, the properties of which were equal to those of the product of Example 4.

The same effect was obtained when, instead of the ethylene-propylene copolymer, we used a low pressure polyethylene prepared according to the Ziegler process ($\eta_{red}=1.2$, determined in a 0.5% solution in tetrahydronaphthalene at 130° C.). With good effect, ⅓ of the hydrocarbon mixture mentioned (boiling range 250–

320° C.) can be replaced by a paraffin wax having a solidification point of 51° C. or by a paraffin slack wax having a solidification point of 35–39° C.

*Example 5*

We first prepared 100 grams of a polyethylene by polymerizing ethylene in a hydrogenated diesel oil fraction (boiling range 180–250° C.) in the presence of a Ziegler catalyst system to obtain a polymer having a $\eta_{spec}/c=0.98$, determined in a 0.5% solution in tetrahydronaphthalene at 130° C. This polyethylene still contained 7 grams of the diesel oil fraction from the manufacturing process. It was heated with 1 liter of carbon tetrachloride in a nickel autoclave to a temperature of 110° C. At said temperature 50 grams of chlorine were forced in. After having stirred the mixture for a further 30 minutes at said temperature, the whole was cooled to 30° C. and the pressure was released. Then 15 grams of sulfur dioxide and 40 grams of chlorine were introduced at said temperature while the reaction mixture was irradiated with an ultraviolet immersion lamp. After having purged with nitrogen, the reaction product was precipitated with methanol and dried in a vacuum drier at 60° C. The yield was 135 grams. The reaction product contained 1.03% of sulfur and 28.8% of chlorine.

On the roll this sulfochlorinated polyethylene yielded a tacky sheet immediately while a polyethylene which had been sulfochlorinated in analogous manner but did not containing any hydrogenated diesel oil yielded a harder sheet, and one which was not rendered tacky until the sulfochlorinated polyetheylene particles had been passed several times through the roll.

We claim:

1. As a new composition of matter having good tackiness (a) a sulfochlorinated polymer consisting of alpha-olefins of 2–6 carbon atoms, which is mixed with (b) 1–20% by weight of a sulfochlorinated hydrocarbon, said hydrocarbon being selected from the group consisting of an aliphatic hydrocarbon of 10–30 carbon atoms, an alkylbenzene having from 4–19 side chain carbon atoms, and a cycloaliphatic hydrocarbon containing 5–6 carbon atoms in the ring and having from 3–10 carbon atoms in the form of side chains.

2. The composition of claim 1 wherein the sulfochlorinated polymer is a sulfochlorinated low pressure ethylene-propylene copolymer.

3. The composition of claim 1 wherein the sulfochlorinated polymer is a sulfochlorinated low pressure polyethylene.

4. The composition of claim 1 wherein said aliphatic hydrocarbon is a petroleum fraction having a boiling range of 180–250° C.

5. The composition of claim 1 wherein the alkylbenzene is diisopropyl toluene.

6. The composition of claim 1 wherein the alkylbenzene is dodecyl benzene.

7. The composition of claim 1 wherein said sulfochlorinated hydrocarbon is employed in an amount of 8–12% by weight, based on the weight of the sulfochlorinated polymer.

8. The composition of claim 1 wherein the sulfochlorinated hydrocarbon is prepared by first chlorinating one of the said hydrocarbons to a chlorine content of 10–50% by weight, and then subjecting it to sulfochlorination.

9. A process for the preparation of a new composition of matter having good tackiness which is composed of a mixture of (a) a sulfochlorinated polymer consisting of alpha-olefins of 2–6 carbon atoms, and (b) 1–20% by weight thereof a sulfochlorinate hydrocarbon, said hydrocarbon being selected from the group consisting of an aliphatic hydrocarbon of 10–30 carbon atoms, an alkylbenzene having from 4–19 side chain carbon atoms, and a cycloaliphatic hydrocarbon containing 5–6 carbon atoms in the ring and having from 3–10 carbon atoms in the form of side chains, which process comprises mixing a polymer of an alpha-olefin of 2–6 carbon atoms with the aforesaid hydrocarbon, and subjecting the resulting mixture to sulfochlorination sufficient to form a tacky product containing about 0.5–2% by weight of sulfur and about 12–30% by weight of chlorine.

10. A process for the preparation of a new composition of matter having good tackiness which comprises preparing a mixture of (a) a sulfochlorinated polymer consisting of alpha-olefins of 2–6 carbon atoms, with (b) 1–20% by weight of a sulfochlorinated hydrocarbon, said hydrocarbon being selected from the group consisting of an aliphatic hydrocarbon of 10–30 carbon atoms, an alkylbenzene having from 4–19 side chain carbon atoms, and a cycloaliphatic hydrocarbon containing 5–6 carbon atoms in the ring and having from 3–10 carbon atoms in the form of side chains, the extent of sulfochlorination being sufficient to form a tacky product containing about 0.5–2% by weight of sulfur and about 12–30% by weight of chlorine.

References Cited in the file of this patent

UNITED STATES PATENTS

| | | |
|---|---|---|
| 2,630,425 | Rodman | Mar. 3, 1953 |
| 2,646,422 | Strain | July 21, 1953 |
| 3,001,964 | Miller | Sept. 26, 1961 |